(12) United States Patent
Kim

(10) Patent No.: US 7,122,074 B2
(45) Date of Patent: Oct. 17, 2006

(54) DEVICE AND METHOD OF REMOVING BUBBLES GENERATED IN MOLDING GLASS FIBER-REINFORCED PLASTIC PARTS

(76) Inventor: Ki-Chul Kim, 104-1802 Hyundai APT, 21-11 Hyosung-1-dong, Gyeyang-gu, Incheon-city 407-805 (KR)

( * ) Notice: Subject to any disclaimer, the term of this patent is extended or adjusted under 35 U.S.C. 154(b) by 275 days.

(21) Appl. No.: 10/683,791

(22) Filed: Oct. 14, 2003

(65) Prior Publication Data

US 2005/0045042 A1    Mar. 3, 2005

(30) Foreign Application Priority Data

Sep. 2, 2003    (KR) ...................... 10-2003-0060987

(51) Int. Cl.
*B01D 19/00* (2006.01)

(52) U.S. Cl. .......................... 96/155; 95/241; 264/102; 425/812

(58) Field of Classification Search .................. 96/155, 96/6, 193; 95/241, 46, 266; 264/102; 425/812, 425/472

See application file for complete search history.

(56) References Cited

U.S. PATENT DOCUMENTS

| | | | | |
|---|---|---|---|---|
| 1,184,259 A | * | 5/1916 | Price ........................... | 264/102 |
| 3,992,501 A | * | 11/1976 | Tatzel et al. ................. | 264/126 |
| 6,315,815 B1 | * | 11/2001 | Spadaccini et al. ............ | 95/46 |

* cited by examiner

*Primary Examiner*—Matthew O. Savage
*Assistant Examiner*—Douglas J. Theisen
(74) *Attorney, Agent, or Firm*—Lowe, Hauptman & Berner

(57) ABSTRACT

Bubbles generated in molding glass fiber-reinforced plastic (GFRP) parts using a mold are removed with a device having a body plate with plural perforated gas vent holes and debubbling pipes. The pipes have a cavity and debubbling holes communicating with the cavity. The holes are on the side of the debubbling pipes. The debubbling pipes extend so the cavity communicates with the vent holes.

10 Claims, 6 Drawing Sheets

(a)

(b)

DEVICE AND METHOD OF REMOVING BUBBLES GENERATED IN MOLDING GLASS FIBER-REINFORCED PLASTIC PARTS

BACKGROUND OF THE INVENTION

1. Field of the Invention

The present invention relates to a device and method of removing bubbles generated in molding glass fiber-reinforced plastic parts.

2. Background of the Related Art

Currently, a variety of parts made of glass fiber-reinforced plastic (hereinafter, referred to as "GFRP") are manufactured, marketed and used. A typical example of such parts is a corrosion-resistant FRP pump which is used in a wide range of industrial fields, including semiconductor fabrication, chemical, waste water treatment, water purification, plating, drug manufacturing and textile industries.

Main parts of this corrosion-resistant FRP pump, such as an impeller, a casing and a shaft sleeve, are made of GFRP. However, these parts contain bubbles at large amounts (about 20% by volume). Such bubbles are disadvantageously liable to cause corrosion in the parts, and reduce the strength, thermal resistance and impact resistance of the parts, and also increase the thermal expansion and shrinkage of the parts. Thus, in order to maintain the corrosion resistance and durability of the parts at a given level, the content of the bubbles in the parts needs to be maintained at less than 5%.

Hereinafter, the cause and mechanism of generation of the bubbles will be concretely described.

Generally, a method of manufacturing the GFRP parts comprises the steps of placing glass fiber in a mold, impregnating the glass fiber with a resin and accelerator mixture and a curing agent, and repeating the step of applying glass fiber. When the resin and accelerator mixture is mixed with the curing agent, curing reaction occurs to generate volatile gas. If the gas is not sufficiently vented out, bubbles will remain in the GFRP parts.

Meanwhile, other bubbles generated in the GFRP parts include large bubbles caused by air or moisture trapped in the parts other than the gas, and small bubbles which remain on the interface between glass fiber and resin since the volatile gas is not removed. In addition, the bubbling is influenced by a molding method, or working conditions, such as temperature and humidity.

The bubbles contained in resin will determine the shrinkage of the resin, and become a factor of changing the surface characteristics and mechanical properties of the resin. Furthermore, the bubbles distributed on the surface and at the inside of the molded parts can reduce the mechanical properties of the parts, and upon the severe change of temperature, cause stress in the resin by shrinkage and expansion, thereby causing the deformation and fracture of the parts. Also, the bubbles have the greatest effect on the reduction of compression strength, transverse tensile strength, interlaminar shear strength and abrasion resistance, which vary depending on a matrix material, and also on the causing of thermal deformation.

Currently, molding of the GFRP parts for use in the FRP pump is conducted by hand working in view of working characteristics. Thus, if the GFRP parts contain bubbles therein, uniform quality will not be obtained even when the molding is conducted by one worker. Also, standardized precise property values of the GFRP parts for use in the corrosion-resistant FRP pump, such as corrosion resistance, strength, thermal resistance, impact resistance and durability, will not obtained.

Meanwhile, in order to remove bubbles, glass fibber may also be used in a powder form in molding the GFRP parts. In this case, however, there is a problem in that the mechanical properties of the glass fiber, such as tensile strength, compression strength, shear strength, abrasion resistance and thermal resistance, are greatly reduced such that the glass fiber does not sufficiently serve as reinforcement. In other words, in order to make the glass fiber act efficiently as reinforcement, the glass fiber must be used in a form cut to have the same size and shape as the parts without breaking or cutting it fine.

SUMMARY OF THE INVENTION

Accordingly, the present invention has been made to solve the above-mentioned problems occurring in the prior art, and an object of the present invention is to provide a device and method for removing bubbles generated in molding glass fiber-reinforced plastic parts, which allow bubbles generated in molding GFRP parts to be effectively removed so that the corrosion resistance to acids or alkalis, mechanical strength and durability of the GFRP parts can be maintained.

To achieve the above object, in one aspect, the present invention provides a device of removing bubbles generated in molding glass fiber-reinforced plastic (GFRP) parts using a mold, the device comprising: a body plate having a plurality of perforated gas vent holes; and debubbling pipes having a cavity and debubbling holes communicating with the cavity, which are formed at the side of the debubbling pipes, the debubbling pipes extending in such a manner that the cavity communicates with the vent holes of the body plate.

In this device, the body plate preferably has a handle mounted on the backside thereof in view of its manipulation.

Furthermore, the debubbling pipes have lengths varying depending on the surface shape of a mold where GFRP is molded into a given shape. This allows bubbles to be removed uniformly.

In another aspect, the present invention provides a method of removing bubbles generated in molding glass fiber-reinforced plastic parts, the method comprising the steps of: laying glass fiber in a mold; applying a resin and accelerator mixture and a curing agent on the glass fiber; lowering the bubble-removing device as described above to the mold such that the end of the debubbling pipes reaches the mold bottom or the vicinity thereof, while laminating layers of the glass fiber and the resin/accelerator/curing agent mixture or within 2 minutes and 30 seconds after laminating the layers; and maintaining the bubble-removing device at the lowered state for 15–30 seconds.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 2a and 2b are front and side views showing the structure of a body plate in the device of FIG. 1a;

FIGS. 3a and 3b are front and side views showing the structure of debubbling pipes in the device of FIG. 1a.

DETAILED DESCRIPTION OF THE PREFERRED EMBODIMENT

Hereinafter, a preferred embodiment of the present invention will be described in detail with reference to the accompanying drawings.

Figure 1:
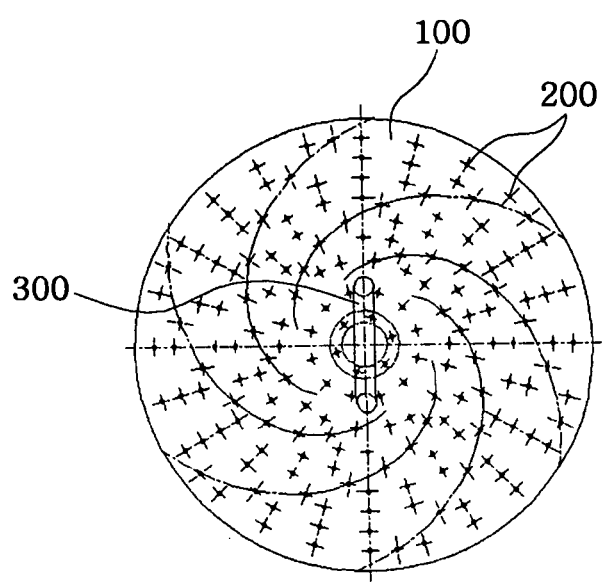
FIGS. 1a and 1b are front and side views showing an example of a bubble-removing device according to the present invention.
Figure 1:
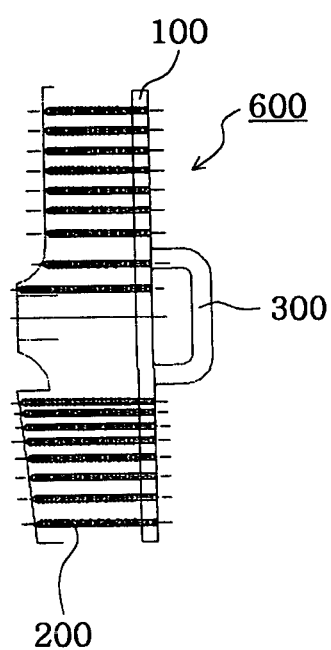
Figure 2:
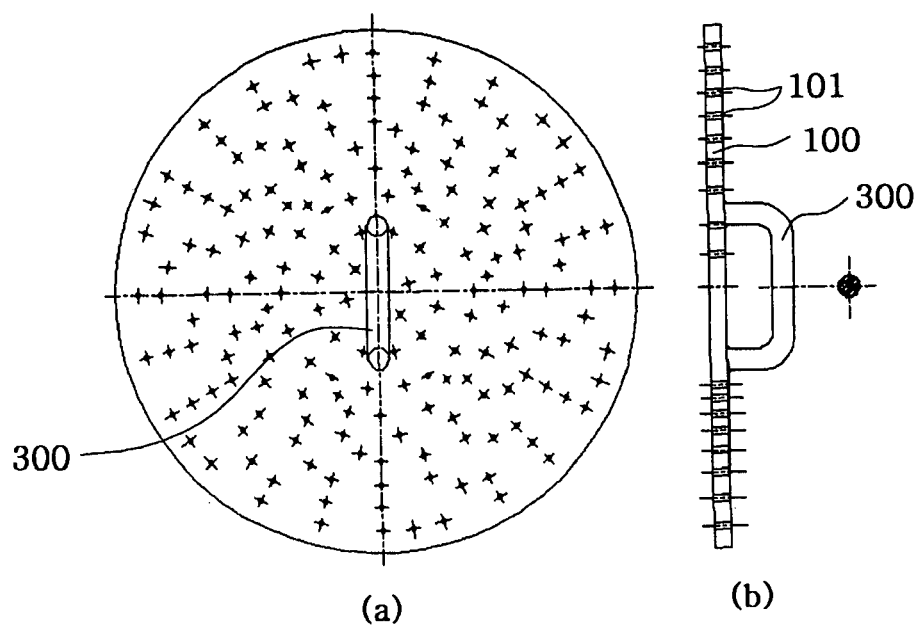
Figure 3:
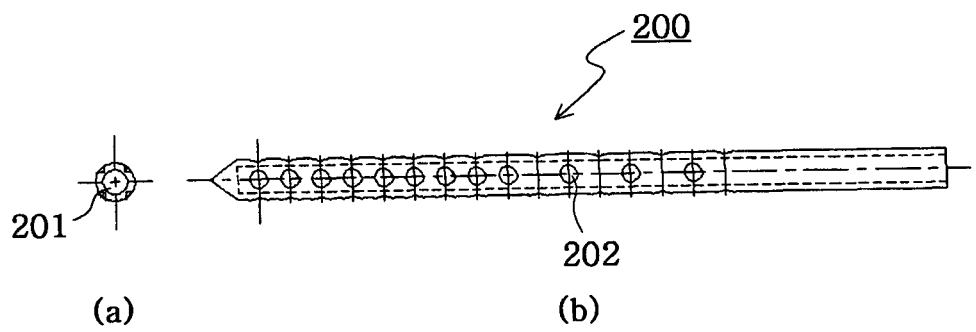

FIGS. 1a and 1b show an example of a bubble-removing device according to the present invention, which can be applied in molding a GFRP impeller for use in a FRP pump. FIGS. 2a and 2b show the structure of a body plate in the device of FIG. 1a, and FIGS. 3a and 3b show the structure of debubbling pipes in the device of FIG. 1a.

As shown in the figures, a bubble-removing device 600 according to the present invention includes a body plate 100 as a support member where pluralities of perforated gas vent holes 101 are formed. Also, debubbling pipes 200, located on opposite sides of the center line of body plate 100, are connected with the respective gas vent holes 101 of the body plate 100, such that pipes 200 extend from a first face of plate 100. Within each of the debubbling pipes 200, there is formed a cavity 201 extending in the longitudinal direction of the debubbling pipes 200. This cavity 201 is formed in such a manner that the cavity 200 communicates with the gas vent holes 101 of the body plate 100. Moreover, each of pipes 200 includes plural debubbling holes 202, at the sides of the pipes and at different distances from body plate 100. Holes 200 communicate with the cavity 201 are formed at the side of the debubbling pipes 200.

Furthermore, on the backside of the body plate 100, i.e., a second face of plate 100 opposite from the first face, a handle 300 is mounted such that the handle extends on opposite sides of the body plate and the center line common to the first and second faces so the bubble-removing device 600 can be applied in an easily grasped state.

Figure 4:
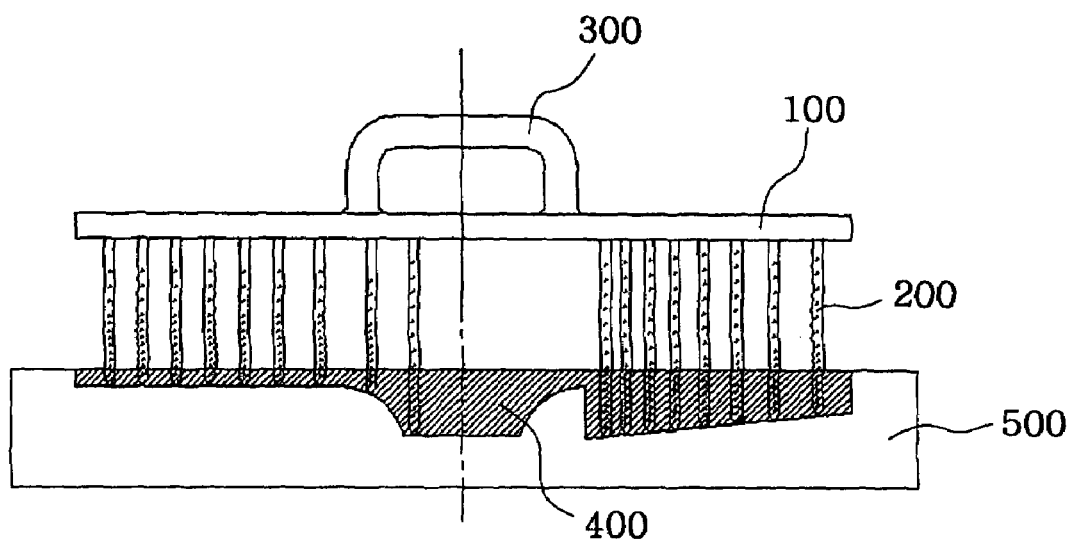
FIG. 4 is a side view illustrating an example of a state where a bubble removal process is performed using a bubble-removing device according to the present invention.
Figure 5:
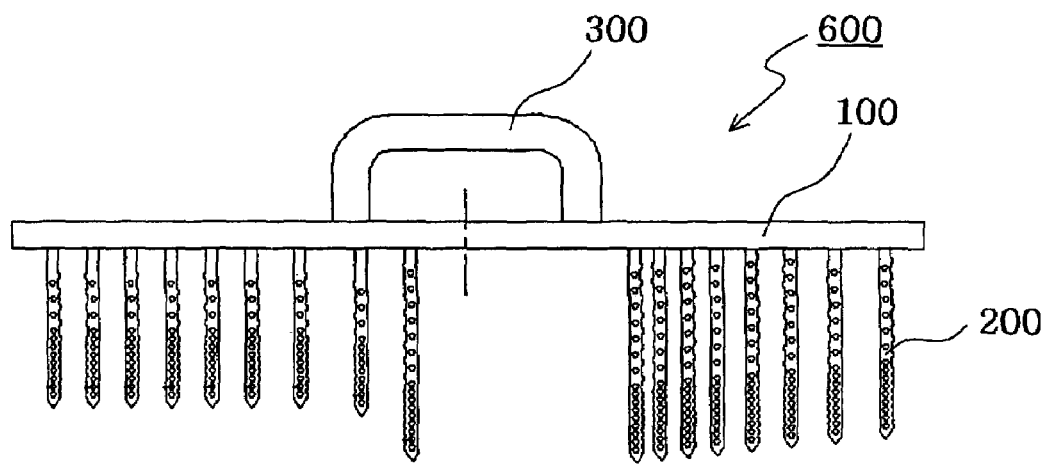
FIG. 5 is a side view showing a bubble-removing device in FIG. 4.
Figure 6:
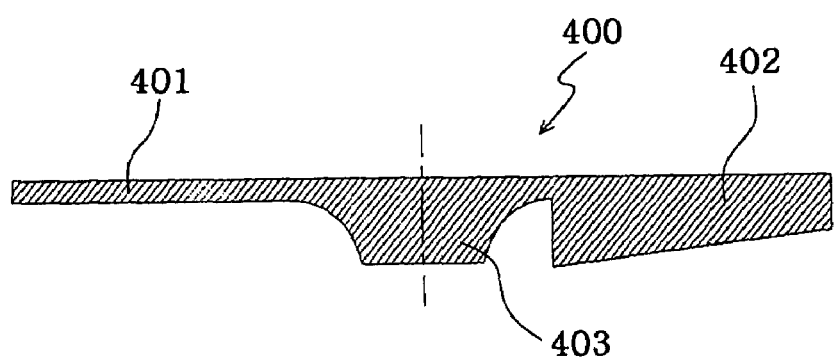
FIG. 6 is a cross-sectional side view of an GFRP impeller molded by the process shown in FIG. 4.
Figure 7:
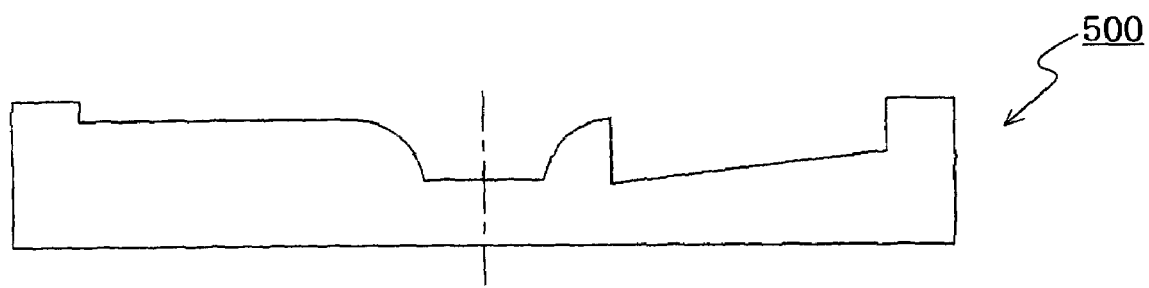
FIG. 7 is a cross-sectional side view of an impeller manufacturing mold shown in FIG. 4.

FIG. 5 shows a bubble-removing device, which is applied in a case where a support plate 401, a blade 402 and a shaft sleeve in a GFRP impeller 400 are unsymmetrical (see, FIG. 6). FIG. 7 shows the structure of a mold corresponding to such an unsymmetrical impeller. Moreover, FIG. 4 shows a state where the bubble-removing device 600 according to the present invention is applied to the unsymmetrical parts of the GFRP impeller.

Figure 8:
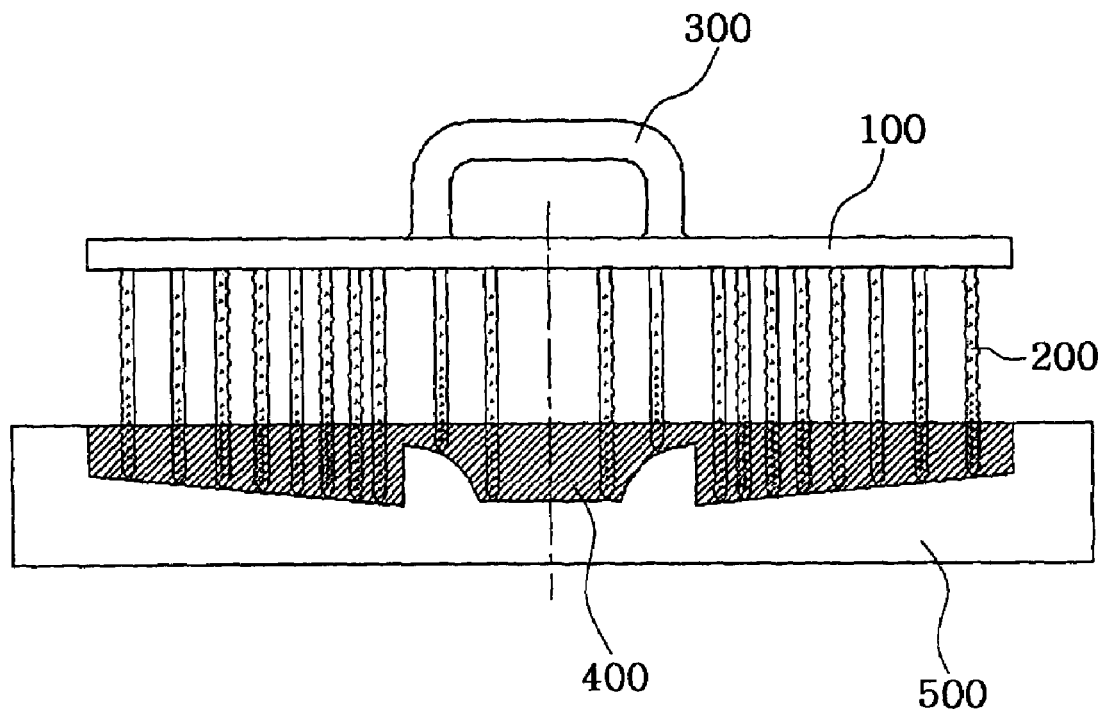
FIG. 8 is a side view illustrating another example of a state where a bubble removal process is performed using a bubble-removing device according to the present invention.
Figure 9:
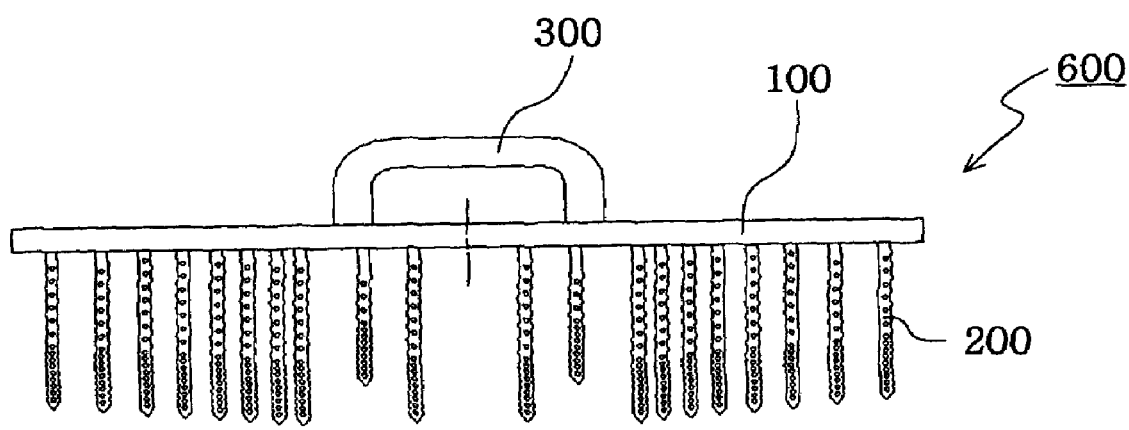
FIG. 9 is a side view showing a bubble-removing device in FIG. 8.
Figure 10:
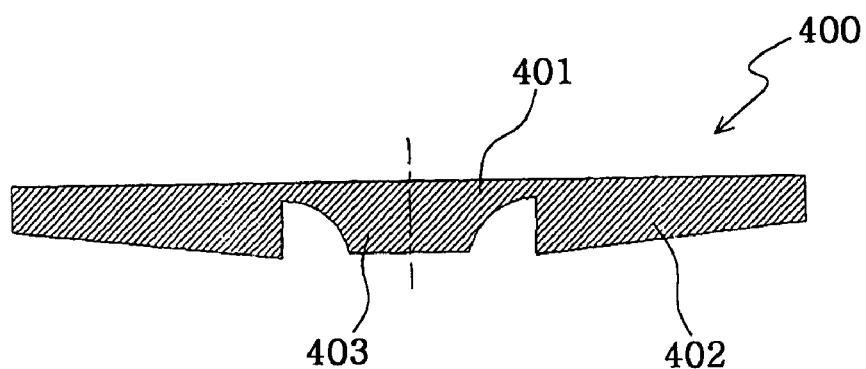
FIG. 10 is a cross-sectional side view of an GFRP impeller molded by the process shown in FIG. 8.
Figure 11:
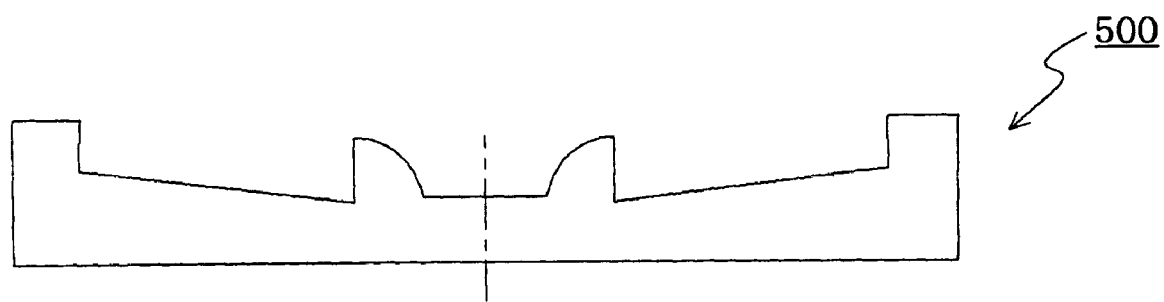
FIG. 11 is a cross-sectional side view of an impeller-manufacturing mold shown in FIG. 4.

FIG. 9 shows a bubble-removing device, which can be applied in a case where the support plate 401, the blade 402 and the shaft sleeve 403 in the GFRP impeller are symmetrical (see, FIG. 10). FIG. 11 shows the structure of a mold corresponding to such a symmetrical impeller. Moreover, FIG. 8 shows a state where the bubble-removing device 600 according to the present invention is applied to the symmetrical parts of the GFRP impeller.

Furthermore, as shown in FIGS. 4 and 8, the debubbling pipes have lengths varying depending on the surface shape of a mold where GFRP is formed into a given shape.

Hereinafter, a method of removing bubbles generated in molding glass fiber-reinforced plastic parts according to the present invention will be described.

First, glass fiber is laid in a mold 500 in one layer, and a resin and accelerator mixture and a curing agent are applied on the glass fiber so that the glass fiber is impregnated with the mixture and the curing agent. Such procedures are repeated such that laminated layers of such materials reach a given height. In the case of an impeller for use in a 3 HP FRP pump, the glass fiber is generally laminated in ten layers each having a thickness of about 0.5–0.7 mm. As the resin, a thermosetting resin such as vinylester is generally used, and as the accelerator, VE-based compounds such as VE1.0 can be used. Also, as the curing agent, a conventional material such as MEKPO 1.0 can be used.

In such procedures, bubbles occur by curing reaction while generating volatile gas. The content of such bubbles is higher at the lower portion than the upper portion. To remove such bubbles, as shown in FIG. 4 or 8, the bubble-removing device 600 according to the present invention is lowered to the mold bottom or the vicinity thereof. Then, the bubbles remaining within the GFRP parts are vented out through the cavity 201 and the debubbling holes 202 formed in each of the debubbling pipes 200. Furthermore, the debubbling pipes 200 of the bubble-removing device 600 according to the present invention have lengths varying depending on the surface shape of the mold. Thus, even if the height of a GFRP impeller to be molded is uniform, the bubble-removing device 600 allows bubbles in the GFRP impeller to be removed uniformly (see, FIGS. 4 and 8).

This lowering of the bubble-removing device according to the present invention is preferably conducted while laminating layers of the glass fiber and the resin/accelerator/curing agent mixture or within 2 minutes and 30 seconds after laminating the layers. If the bubble-removing device is lowered to the mold past 2 minutes and 30 seconds after laminating the layers, the curing agent will start to harden, and already generated gas will flow into the hardened portions of the curing agent and form bubbles therein such that the formed bubbles are difficult to remove.

The bubble-removing device according to the present invention is preferably maintained at a state lowered to the mold for 15–30 seconds after laminating all the layers of the glass fiber, the resin and the curing agent. If a period during which the bubble-removing device is maintained at the lowered state is shorter than 15 seconds, bubbles will not be sufficiently removed. If the period is longer than 30 seconds, an additional effect will not be obtained and damages to the resulting product will be caused.

Although the bubble-removing device is preferably applied after laminating all the layers of the glass fiber, the mixture and the curing agent as described above, it is also possible that the bubble-removing device is applied after laminating any layers of these materials, and then the procedures of laminating the layers and applying the device are repeated.

The bubble-removing device is not limited only to use in molding corrosion-resistant FRP pump parts, and can be used in a wide range of industrial fields utilizing FRP, including aerospace industries, shipbuilding industries, semiconductor fabrication, building instruments and materials, bridges, automobiles, environmental products, and leisure industries.

As described above, the present invention allows the content of bubbles in molded GFRP parts to be greatly reduced so that it can prevent the parts from being corroded by acids or alkalis, and increase the strength, thermal resistance and impact resistance of the products, and also reduce the thermal expansion and shrinkage of the products. This can greatly improve the quality, durability and reliability of the products.

Furthermore, according to the present invention, glass fiber is used in a form cut to have the same size and shape as the parts, so that the glass fiber can sufficiently serve as reinforcement.

Moreover, the present invention can prevent product quality from being different depending on a worker, such that standardized and automated working system for molding GFRP parts can be established.

In addition, the present invention allows inferior products caused by bubbles to be reduced such that material costs can be reduced by 40–50%.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A device for removing bubbles generated in molding glass fiber-reinforced plastic (GFRP) parts using a mold, the device comprising:
   a body plate having a plurality of perforated gas vent holes; and
   debubbling pipes having a cavity and debubbling holes communicating with the cavity, the holes being at the side of the debubbling pipes, the debubbling pipes extending in such a manner that the cavity communicates with the vent holes of the body plate, the debubbling pipes having differing lengths depending on the surface shape of a mold for molding GFRP into a given shape.

2. The device of claim 1, wherein the body plate includes a handle on a first face thereof opposite from a second face thereof from which the debubbling pipes extend.

3. The device of claim 1, wherein the debubbling pipes are on opposite sides of a center line of the body plate.

4. The device of claim 2, wherein the handle extends on opposite sides of a center line of the body plate.

5. A device for removing bubbles generated in molding glass fiber-reinforced plastic (GFRP) parts using a mold, the device comprising:
   a body plate having a plurality of perforated gas vent holes;
   debubbling pipes having a cavity and debubbling holes communicating with the cavity;
   the holes being at the side of, and along the lengths of, the debubbling pipes at different distances from the body plate;
   the debubbling pipes extending in such a manner that the cavity communicates with the vent holes of the body plate;
   the debubbling pipes having a free end remote from the body plate for immersion into the mold.

6. The device of claim 5, wherein the debubbling pipes are on opposite sides of a center line of the body plate.

7. The device of claim 5, wherein the debubbling pipes have differing lengths depending on the surface shape of the mold for molding GFRP into a given shape.

8. The device of claim 5, wherein the body plate includes a handle on a first face thereof opposite from a second face thereof from which the debubbling pipes extend.

9. The device of claim 8, wherein the handle extends on opposite sides of a center line of the first face.

10. The device of claim 9, wherein the debubbling pipes are located on opposite sides of a center line of the second face.

* * * * *